United States Patent [19]
Minabe et al.

[11] Patent Number: 5,559,414
[45] Date of Patent: Sep. 24, 1996

[54] CONTROL UNIT OF DIRECT-CURRENT MOTOR

[75] Inventors: Kouji Minabe; Hideo Nishijima, both of Hitachinaka; Kouji Kaniwa, Yokohama; Hiroya Abe, Hiratsuka; Yoshio Narita, Hitachinaka, all of Japan

[73] Assignee: Hitachi, Ltd., Tokyo, Japan

[21] Appl. No.: 409,660

[22] Filed: Mar. 24, 1995

[30] Foreign Application Priority Data

Apr. 1, 1994 [JP] Japan .................... 6-065212

[51] Int. Cl.$^6$ .................................. G11B 19/28
[52] U.S. Cl. .................. 318/606; 318/479; 318/599; 318/600
[58] Field of Search ................. 318/268, 442, 318/448, 478, 479, 599–608, 611, 632, 638; 360/73.01; 369/189, 196, 239; 323/299

[56] References Cited

U.S. PATENT DOCUMENTS

| | | | |
|---|---|---|---|
| 4,527,102 | 7/1985 | Gotou | 318/254 |
| 4,772,830 | 9/1988 | Kobari et al. | 318/563 |
| 4,855,652 | 8/1989 | Yamashita et al. | 318/268 |

OTHER PUBLICATIONS

Sony Semiconductor IC data book, 1989, pp. 338–339, 361–362, 376–377, Japan.

*Primary Examiner*—Bentsu Ro
*Attorney, Agent, or Firm*—Antonelli, Terry, Stout & Kraus

[57] ABSTRACT

A control unit of a direct-current motor used in a magnetic recording and reproducing device or the like, which generates a digital error signal by processing a rotational frequency signal (a rotational frequency signal and a rotational phase signal when necessary) detected from a motor to be controlled, and furthermore, obtains a digital correction signal by processing the value of the power source voltage and corrects the digital error signal using the correction signal to compensate power source voltage fluctuation.

13 Claims, 6 Drawing Sheets

CONTROL UNIT OF DIRECT-CURRENT MOTOR

BACKGROUND OF THE INVENTION

The present invention relates to a control unit of a direct-current motor, and more particularly to a control unit of a direct-current motor suitable for use in a magnetic recording and reproducing device or the like.

A conventional example of a control unit of a direct-current motor in a helical scanning type magnetic recording and reproducing device is shown in FIG. 1 (See "SONY Semiconductor IC Data Book (1989)" pp. 338–339, pp. 361–362 and pp. 376–377). In FIG. 1, a reference numeral 201 represents a drum motor for driving a rotary head, 202 a capstan motor for driving a tape, 203 a pinch roller and 204 a magnetic tape, respectively. The drum motor 201 is fitted with detectors 205 and 206 for detecting a rotational frequency and a rotational phase thereof, respectively. The frequency detector 205 detects a magnetic field change attendant upon the rotation of the drum motor 201 for instance using a stationary coil, and the rotational phase detector 206 detects a magnetic field change caused by a magnet fitted at a specific location of a rotor of the drum motor 201 for instance using a stationary coil.

The rotational frequency signal $S_{DF}$ and a rotational phase signal $S_{DP}$ detected by means of the detectors 205 and 206 are fed into waveform shapers 209 and 210 through amplifiers 207 and 208 and converted into rectangular wave signals, and are fed thereafter into a circuit 211 for computing an error of the rotational frequency (the number of rotations) and an error of the rotational phase. The error arithmetic circuit 211 outputs the values of the errors obtained by processing the frequency signal $S_{DF}$ and the phase signal $S_{DP}$ as digital signals in m bits.

A digital frequency error signal $A_{DF}$ and digital phase error data $A_{DP}$ are converted into analog signals by means of DA converters 212 and 213 and limited in bands by means of low-pass filters 214 and 215, and are added analogically to each other thereafter by an adder 216. An obtained analog error signal $S_{AD}$ undergoes required compensation of the gain and compensation of the phase by means of an analog amplifier 217 and an analog phase compensator 218, and fed into a control signal generating circuit 220 thereafter through an analog differential amplifier 219.

The control signal generating circuit 220 generates a pulse width modulation signal (a PWM signal) in which the pulse width changes in accordance with the value of the analog error signal $S_{AD}$ and supplies the relevant signal to a chopper circuit 221 as a control signal $S_{PWM}$ of the chopper circuit 221. The chopper circuit 221 intermits voltage $E_0$ supplied from a direct-current power source 224 under the control of the control signal $S_{PWM}$, thus generating a motor driving signal $S_{DR}$. This driving signal is smoothed by means of a smoothing circuit 222 and supplied to an exciting coil (not shown) of the drum motor 201 thereafter, thereby to control the rotational frequency and the rotational phase of the motor. Besides, the driving signal $S_{DR}$ after smoothing is fed back to one terminal of the differential amplifier 219 through a feedback circuit 223, and is used as a negative feedback signal for compensating fluctuation of the power source voltage $E_0$.

Viewed in the light of achieving miniaturization or low cost of a recording and reproducing device, it is desirable that the control unit of the drum motor 201, in particular the processing circuit of error signals (the frequency error signal $A_{DF}$ and the phase error signal $A_{DP}$) is digitized as far as practicable. Because, when it is possible to digitize the circuit, it is possible to omit analog circuit components such as a DA converter and a low-pass filter that cause to make the device larger in size and increase the cost thereof. However, since the generating circuit of the driving signal $S_{DR}$ composed of the differential amplifier 219, the control signal generating circuit 220, the chopper circuit 221, the smoothing circuit 222 and the feedback circuit functions practically as a negative feedback power amplifier, it is required to convert the digital error signals $A_{DF}$ and $A_{DP}$ for making the generating circuit operate into analog signals and feed these analog signals into the differential amplifier 219. As a result, it has been technically difficult to digitize all of the processing circuits of these error signals with the conventional circuit configuration shown in FIG. 1.

SUMMARY OF THE INVENTION

It is an object of the present invention to propose, in order to realize miniaturization or low cost of a magnetic recording and reproducing device, a unique circuit configuration capable of digitizing a control unit of a direct-current motor used in the device, in particular the error signal processing circuit thereof extensively.

The reason why a generating circuit of a motor driving signal that is practically a negative feedback power amplifier has been adopted in the prior art described above is that it was required to compensate undesirable fluctuation of power source voltage. Accordingly, in a control unit of a direct-current motor of the present invention, means for obtaining a digital correction signal by processing the value of the power source voltage, thereby to correct the digital error signal using the correction signal, has been adopted as a new power source voltage fluctuation compensation means in addition to conventional means for generating a digital error signal by processing the rotational frequency signal (the rotational frequency signal and the rotational phase signal when necessary) detected from a motor to be controlled.

The principle of a motor control unit of the present invention will be described with reference to FIG. 2. FIG. 2 illustrates the waveforms of the PWM modulation signal $S_{PWM}$ supplied to the chopper circuit for intermitting the driving power source of the motor to be controlled and the waveforms of the motor driving signal $S_{DR}$ that is the output of the chopper circuit while comparing these waveforms with each other. FIG. 2a shows a case when a duty ratio of the control signal $S_{PWM}$ has changed from 50% to 40% as the result that the error signal taken out of the motor to be controlled has changed due to some causes.

Now, it is assumed that the value $E_0$ of the power source voltage is 9 V. The motor driving signal $S_{DR}$ shows a voltage waveform that changes between 0 V and 9 V before smoothing, and shows 4.5 V during the period of the duty ratio at 50% of the control signal $S_{PWM}$ and 3.6 V during the period of the duty ratio at 40% of the signal after smoothing as shown in FIG. 2b. Accordingly, when the duty ratio of the control signal $S_{PWM}$ is changed from 50% to 40%, the quantity of voltage variation of the driving signal $S_{DR}$ after smoothing in accordance with the change of the duty factor is 0.9 V (4.5 V–3.6 V). Next, it is assumed that the power source voltage $E_0$ drops from 9 V to 6 V. The driving signal $S_{DR}$ shows a voltage waveform that changes between 0 V and 6 V before smoothing, and shows 3.0 V during the period of the duty ratio at 50% of the control signal $S_{PWM}$ and 2.4 V during the period of the duty ratio at 40% of the signal after smoothing as shown in FIG. 2c. Thus, when the duty ratio of the control signal $S_{PWM}$ is changed from 50% to 40%, the quantity of the voltage variation of the driving signal $S_{DR}$ after smoothing in accordance with the change of the duty ratio is 0.6 V (3.0 V–2.4 V). This fact means that, when the power source voltage shows fluctuation, the driving signal to be supplied to the motor to be controlled becomes no longer vary following in the wake of the change of the error signal obtained from the motor, in other words, the loop gain of the motor control circuit changes on the whole, which produces primary causes of incurring instability of the control system.

Accordingly, in the present invention, the value $E_0$ of the power source voltage is converted into a digital signal, such a correction factor K that satisfies the relationship:

Correction factor $K$×power source voltage $E_0$ ≈constant is obtained by digital operation, and the value of the digital error signal is multiplied by the correction factor, thereby to perform correction of the signal. As a result, when the correction factor K is set so as to be 1.0 when the power source voltage $E_0$ is 9 V and 1.5 when the power source voltage $E_0$ is 6 V, it becomes possible to make the PWM control signal generating circuit operate so that the change of the duty ratio of the control signal $S_{PWM}$ attendant upon the change of the error signal becomes 1.5 times as large as that in the case of 9 V when the power source voltage $E_0$ drops from 9 V to 6 V, thus making it possible to change the motor driving signal $S_{DR}$ following to the change of the error signal irrespective of the fluctuation of the power source voltage $E_0$.

Namely, since the duty ratio of the control signal $S_{PWM}$ changes from 40% (the right of FIG. 2a) to 35% (the right of FIG. 2a') before correction when the digital error signal is corrected with the correction factor K=1.5. Therefore, the driving signal $S_{DR}$ (after smoothing) when the power source voltage $E_0$ drops to 6 V also changes from 2.4 V (the right of FIG. 2c) to 2.1 V (the right of FIG. 2c') before correction. As a result, it is possible to maintain the difference of the driving signals $S_{DR}$ (after smoothing) before and after the change of the error signal at 0.9 V in spite of the fluctuation of the power source voltage $E_0$.

Even when such correction is made, however, the absolute value of the driving signal $S_{DR}$ after smoothing drops from 4.5 V to 3.0 V (the right of FIG. 2b and the left of FIG. 2c) when the power source voltage $E_0$ changes from 9 V to 6 V for instance. Therefore, it is desirable to correct with an offset value H in addition to the correction with the factor K. It is possible to perform such correction by converting the value $E_0$ of the power source voltage into a digital signal, obtaining such an offset value H that satisfies the relationship:

Offset value $H$×power source voltage $E_0$ ≈constant by digital operation, and adding the offset value to the digital error signal value. Namely, if a value corresponding to one half of the maximum value of the digital error signal (such an error value that generates a control signal $S_{PWM}$ of the duty ratio at 50%) is set as the offset value H when the power source voltage $E_0$ is 9 V for instance, when the digital error signal is in a state of zero and the power source voltage $E_0$ changes from 9 V to 6 V, a control signal $S_{PWM}$ of the duty ratio at 75% (the left of FIG. 2a") is outputted from the control signal generating circuit, and it is possible to generate a driving signal $S_{DR}$ at 4.5 V (after smoothing) same as that when the power source voltage $E_0$ is 9 V (see the left of FIG. 2b").

DESCRIPTION OF THE PREFERRED EMBODIMENTS

Figure 1:
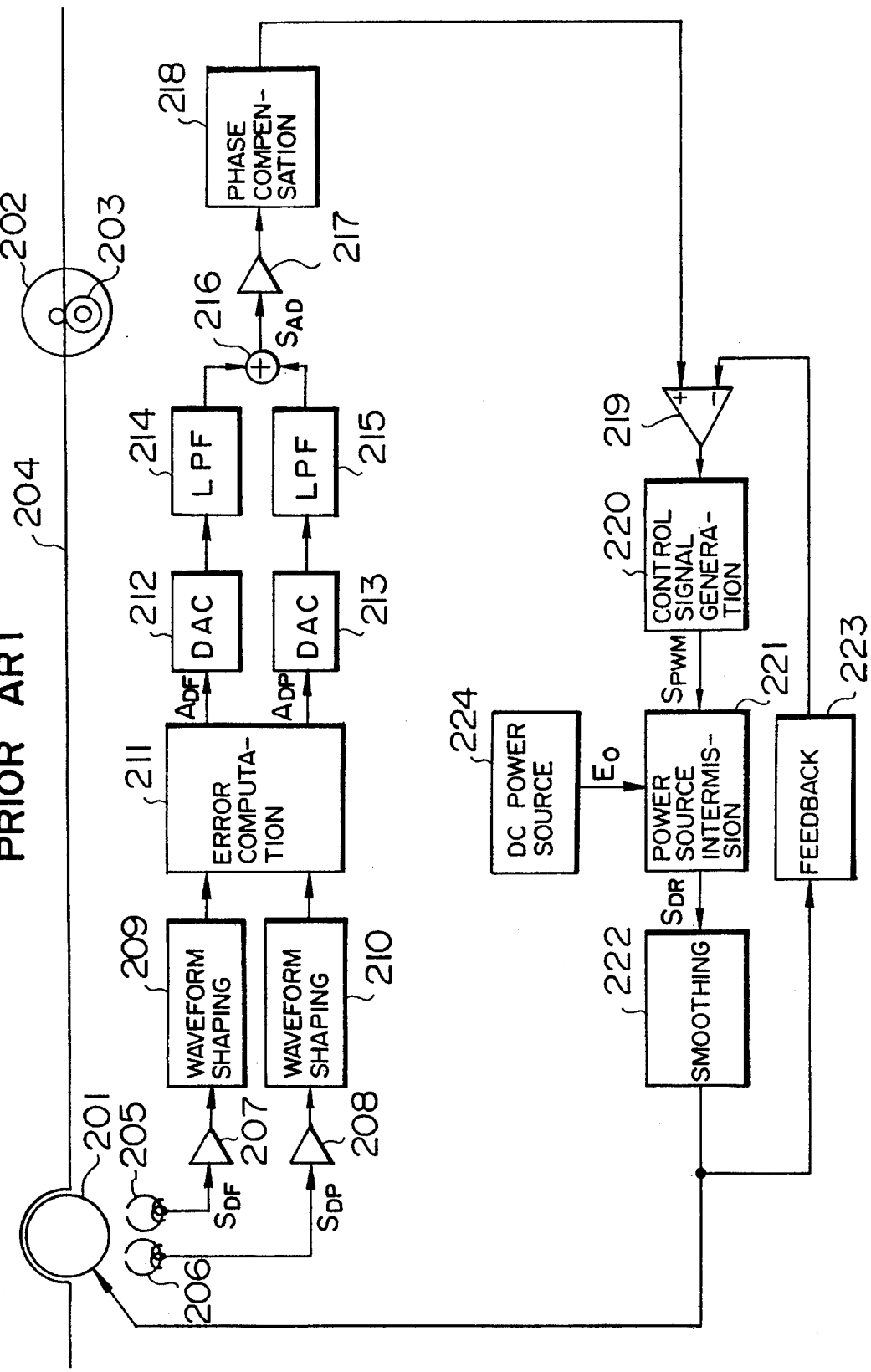
FIG. 1 is a system diagram showing a conventional motor control unit.
Figure 2:
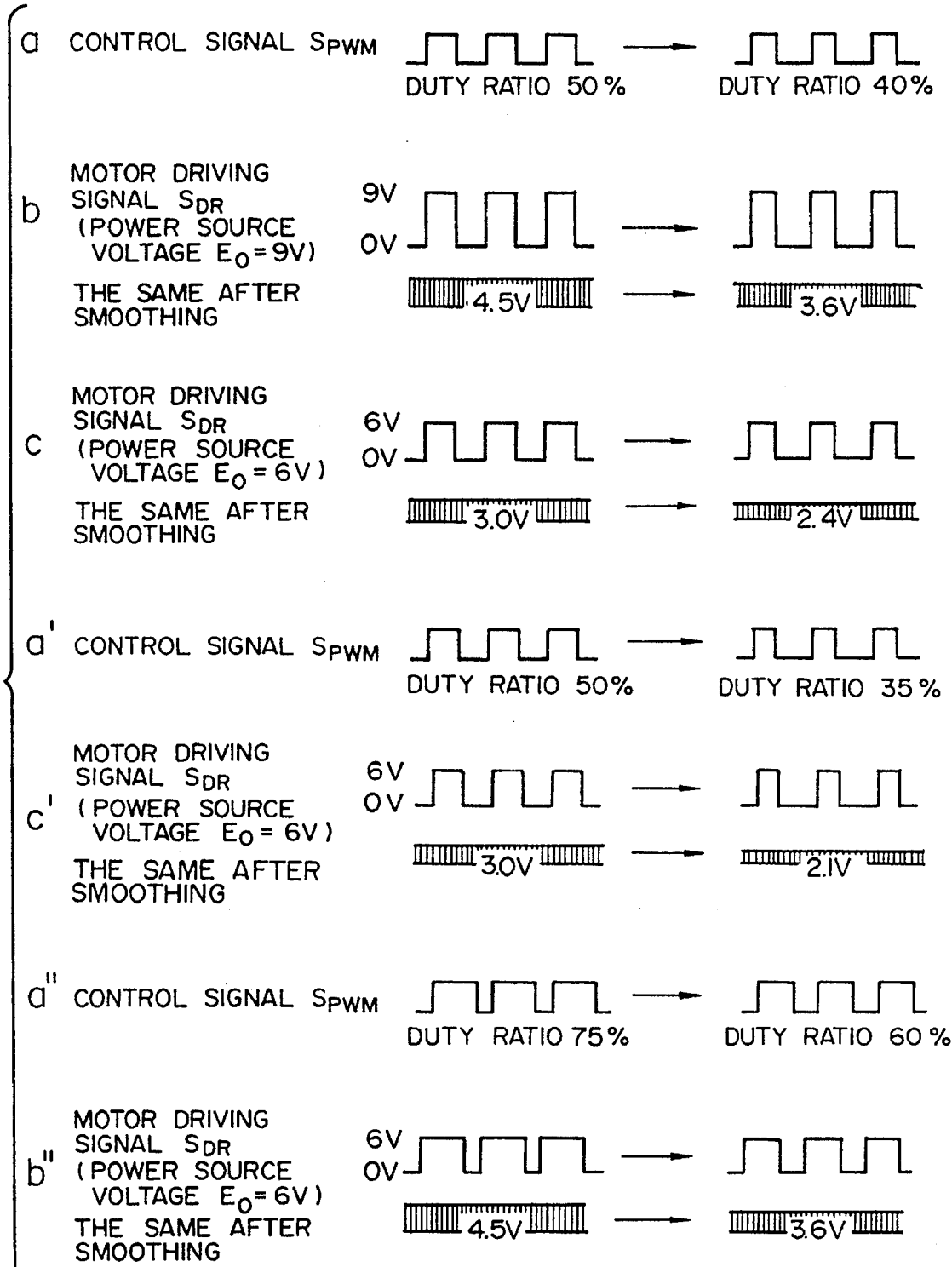
FIG. 2 shows waveform diagrams for explaining the principle of a motor control unit of the present invention.

A motor control circuit according to the present invention will be described in further detail hereinafter with reference to the embodiments shown in the drawings.

Embodiment 1

Figure 3:
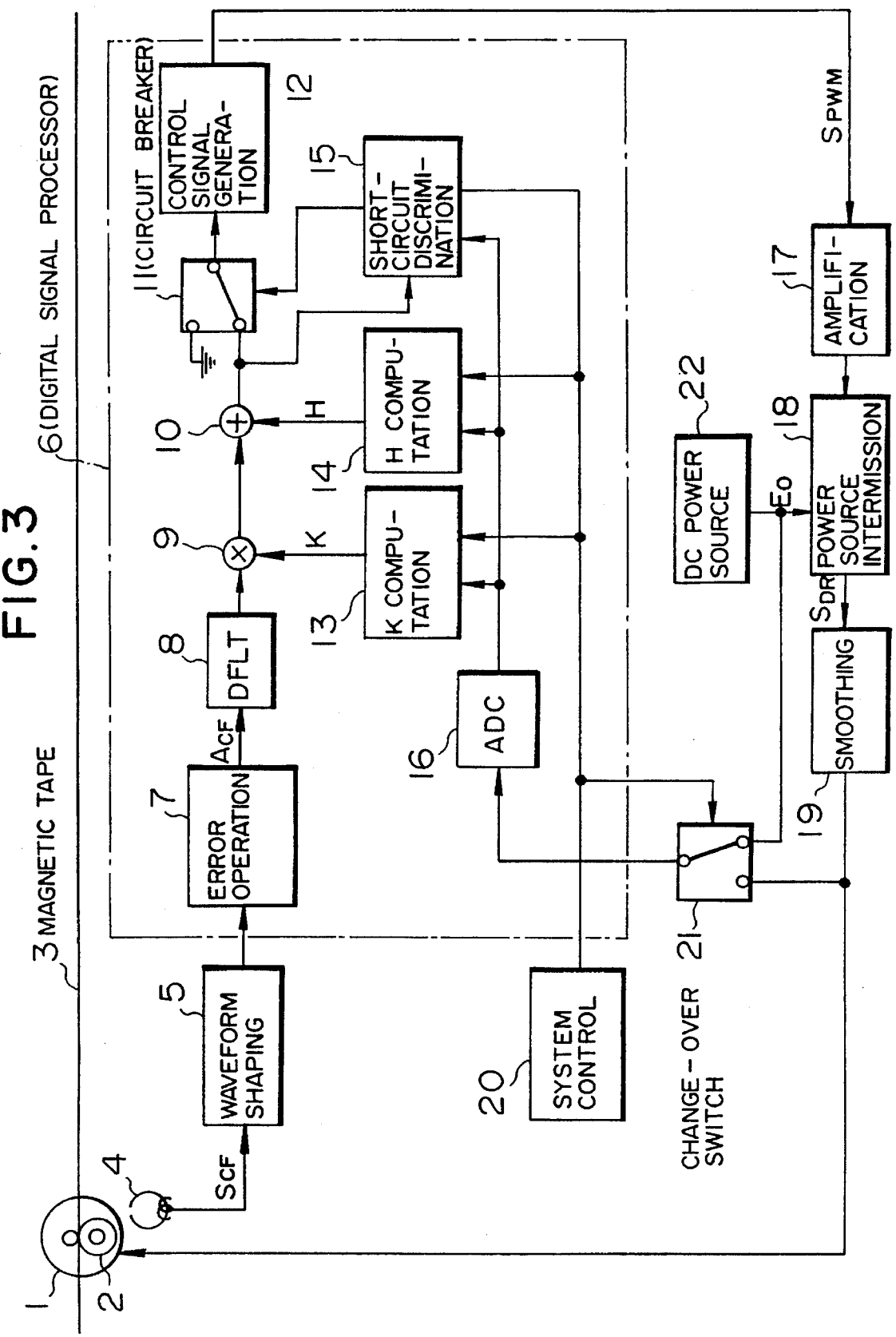
FIG. 3 is a system diagram showing a first embodiment of a motor control unit according to the present invention.

FIG. 3 shows an embodiment in which the present invention is applied to a capstan type aural signal recording and reproducing device. In FIG. 3, a reference numeral 1 represents a capstan motor, 2 a pinch roller, 3 a magnetic tape, 4 a frequency detector and 5 a waveform shaper, respectively. The frequency detector 4 outputs a signal $S_{CF}$ proportional to the rotational frequency of the capstan motor 1. The detected frequency signal $S_{CF}$ being a sinusoidal wave signal, it is supplied to an error operation circuit 7 of a digital signal processing circuit 6 after being converted into a rectangular wave signal using the waveform shaper 5. The error operation circuit outputs a frequency error obtained by processing the frequency signal $S_{CF}$ as a digital signal in m bits. The process of signal processing up to this point is the same as that in the prior art shown in FIG. 1.

The digital signal processing circuit 6 is composed of a digital filter 8, a digital multiplier 9, a digital adder 10, a circuit breaker 11, a PWM control signal generating circuit 12, a factor computing element 13, an offset computing element 14, a short-circuit discriminator 15 and an AD converter 16 in addition to the error operation circuit 7 described above. A frequency error signal $A_{CF}$ that is the output of the error operation circuit 7 is supplied to the digital filter 8 and undergoes processing of smoothing and phase compensation, and fed into the control signal generating circuit 12 thereafter through the digital multiplier 9, the digital adder 10 and the circuit breaker 11 (the operation thereof will be described later).

Figure 4:
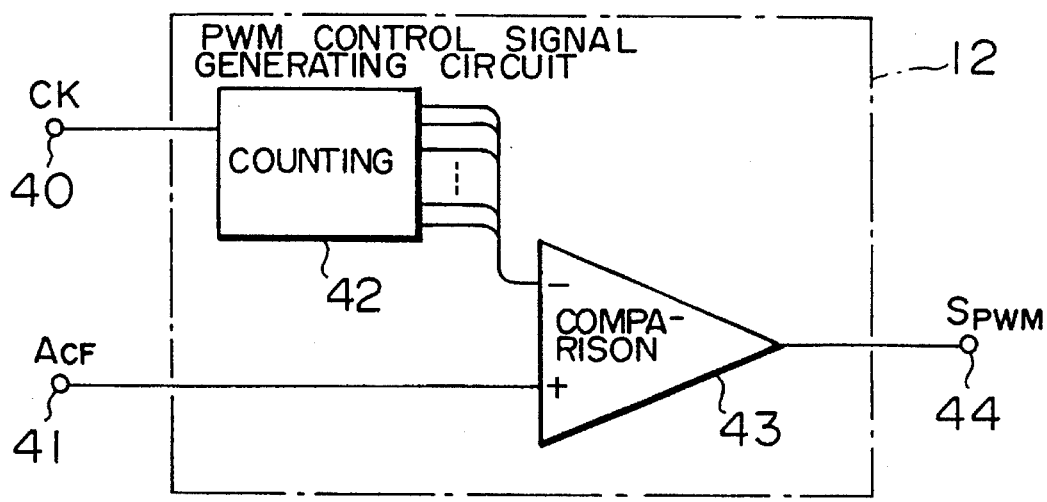
FIG. 4 is a system diagram showing an exemplification of a generating circuit of a PWM control signal used in a motor control unit of the present invention.
Figure 5:
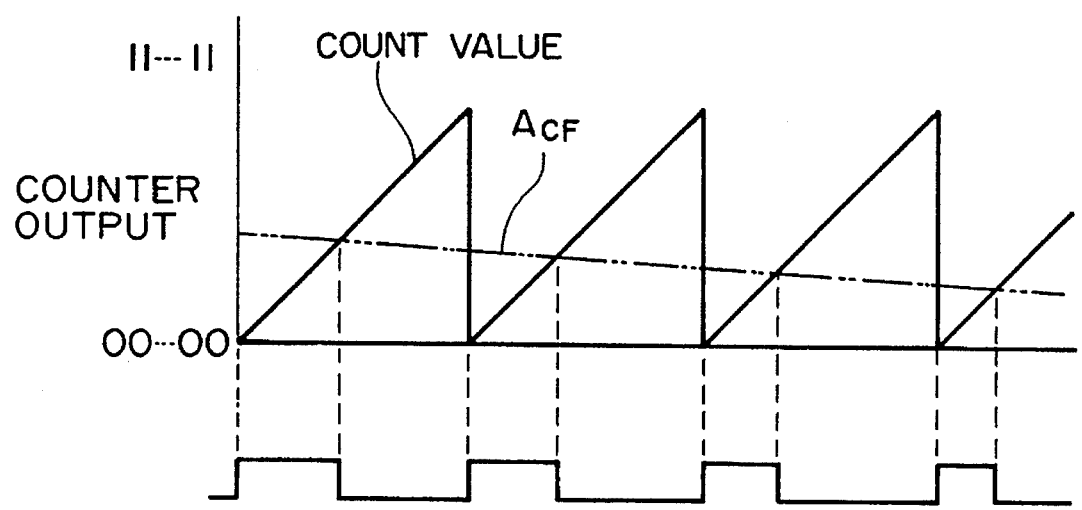
FIG. 5 is an operation explanatory view of the PWM control signal generating circuit shown in FIG. 4.

The control signal generating circuit 12 is composed of a digital counter 42 and a digital comparator 43 as shown in FIG. 4. The counter 42 counts clock pulses CK fed into through an input terminal 40, and feeds the counting result into a negative side terminal of the comparator 43 as a digital signal in m bits same as the frequency error signal $A_{CF}$. On the other hand, the frequency error signal $A_{CF}$ is fed into a positive side terminal of the comparator 43 through another input terminal 41. The comparator 43 is structured so as to compare the frequency error signal $A_{CF}$ with the clock pulse count value, and to put the output to a low level when both values coincide with each other and put the output to a high level when the counter takes a round (timing when a higher digit signal is outputted for instance). Thus, the comparator 43 generates a PWM control signal $S_{PWM}$ in which the high level period changes corresponding to the size of the value of the frequency error signal $A_{CF}$ and outputs the control signal through an output terminal 44.

In FIG. 3, the control signal $S_{PWM}$ outputted from the control signal generating circuit 12 is fed into a chopper circuit 18 through a pulse amplifier 17. The chopper circuit 18 intermits a direct-current power source 22 using the control signal $S_{PWM}$ similarly to the case of the prior art, thereby to generate a driving signal $S_{DR}$ for the capstan motor 1. This driving signal is supplied to an exciting coil (not shown) of the motor 1 after being smoothed by means of a smoothing circuit 19, thereby to control the rotational frequency of the motor 1.

On the other hand, an AD converter 16 of the digital signal processing circuit 6 takes in the value $E_0$ of the power source voltage through a change-over switch 21 and converts the value $E_0$ into a digital signal in m bits, and feeds it thereafter into the factor computing element 13, the offset computing element 14 and the short-circuit discriminator 15. The factor computing element 13 computes a correction factor K that satisfies the relationship:

Correction factor $K$×power source voltage $E_0$ ≈constant based on the power source voltage $E_0$, and feeds the factor K into the digital multiplier 9. The multiplier multiplies the value of the digital frequency error signal $A_{CF}$ supplied through the digital filter 8 by the correction factor K, thereby to correct the signal. The offset computing element 14 computes such an offset value H that satisfies the relationship:

Offset value $H$×power source voltage $E_0$ ≈constant also based on the power source voltage $E_0$, and feeds the value H into the digital adder 10. The adder adds the offset value H to the value of the error signal $A_{CF}$ after correction with the factor by the multiplier 9 thereby to correct the signal, and feeds the corrected signal into the control signal generating circuit 12 through the circuit breaker 11.

When a short-circuit to ground is generated in the circuit reaching the drum motor 1 from the smoothing circuit 19, there is a possibility that the current of the power source 22 is increased abnormally and the power source circuit is damaged. In order to prevent such a damage trouble, the device of the present embodiment is structured so that the value of the voltage (the driving signal $S_{DR}$ after smoothing) on the output side of the smoothing circuit 19 is taken into the signal processing circuit 6 through one terminal of the change-over switch 21. The voltage value of the taken-in driving signal $S_{DR}$ is converted into a digital signal by means of the AD converter 16 and fed into the short-circuit discriminator 15.

Since the voltage on the output side of the smoothing circuit 19 drops suddenly when a trouble of short-circuit to ground occurs, the value of the digital signal on the output side of the AD converter 16 also drops suddenly. The short-circuit discriminator 15 compares the value of the relevant digital signal with the value of the frequency error signal $A_{CF}$, and determines that a trouble of short-circuit to ground has occurred when the difference between both values exceeds a predetermined value and makes the circuit breaker 11 operate. As a result, supply of the frequency error signal $A_{CF}$ to the control signal generating circuit 12 is intercepted and the operation of the power source intermission circuit is suspended.

It is not necessarily required to supply the digital signal (monitoring signal) in succession to the factor computing element 13, the offset computing element 14 and the short-circuit discriminator 15. Therefore, a system controller 20 for having the factor computing element 13, the offset computing element 14, the short-circuit discriminator 15 and the change-over switch 21 operate while dividing them timewise is provided in the present embodiment. With such a structure, it is possible to suspend the monitoring operation of a short-circuit to ground during monitoring of the power source voltage, and on the other hand, to suspend the monitoring operation of the power source voltage during monitoring of the short-circuit to ground.

Besides, the offset value is computed based on the power source voltage in the present invention, but it is also possible to omit the offset computing element 14 and to add a fixed offset value corresponding to one half of the maximum value of the digital error signal $A_{CF}$ to the error signal. Although the offset value and the correction factor can not be controlled independently when such a structure is adopted, there is no problem in particular in normal motor control, and it is possible to further curtail the circuit scale.

Embodiment 2

Figure 6:
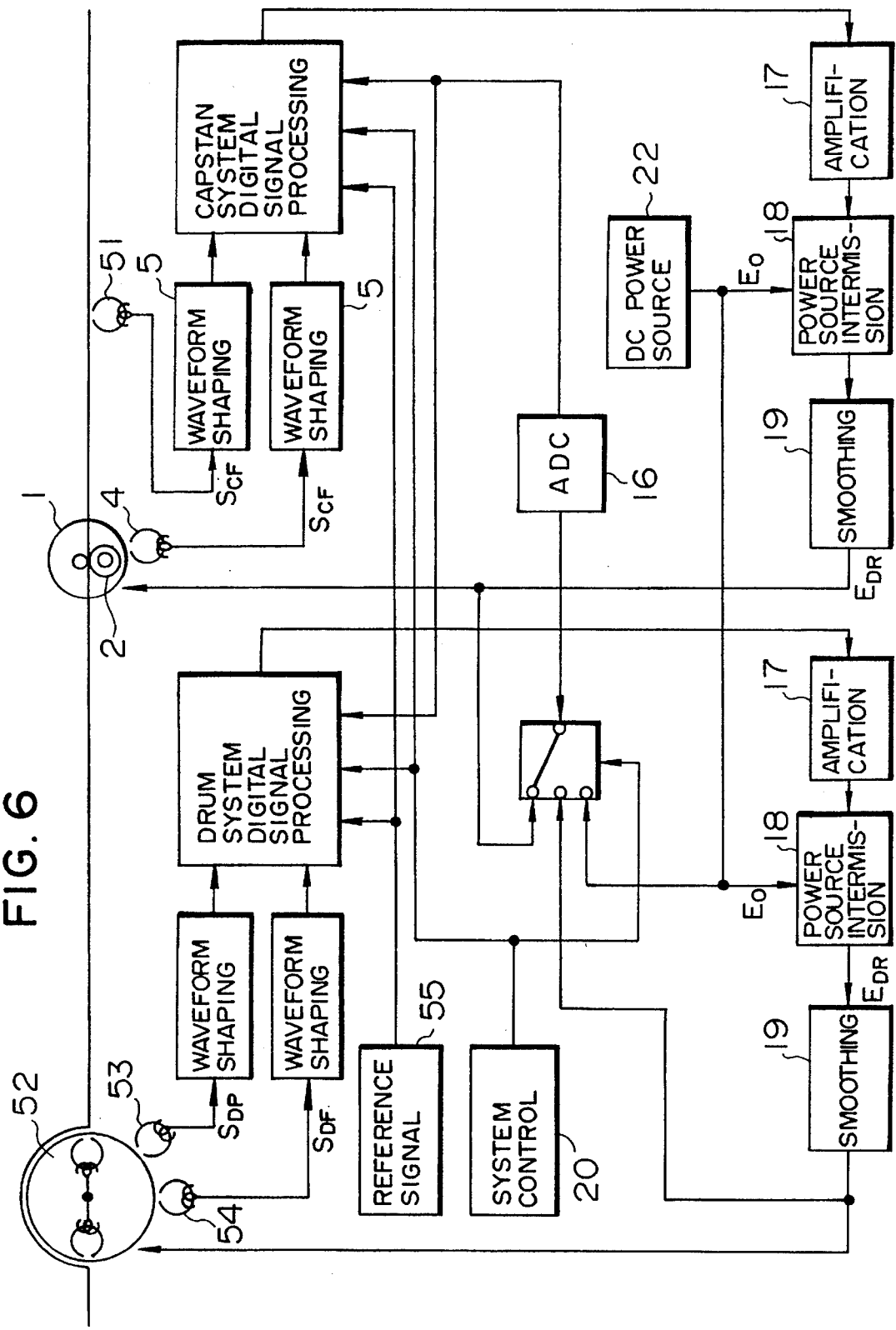
FIG. 6 is a system diagram showing a second embodiment of a motor control unit according to the present invention.

Another embodiment in which the present invention is applied to a helical scanning type magnetic recording and reproducing device is shown in FIG. 6. In FIG. 6, it is assumed that the same reference numerals as those in FIG. 1 represent the same articles or similar articles. In the present embodiment, a detector 4 for detecting a rotational frequency of a capstan motor 1 and detectors 53 and 54 for detecting a rotational frequency and a rotational phase of a drum motor 52 are disposed, respectively, and a control signal recording and reproducing magnetic head 51 is used additionally as a detector of the rotational phase of the capstan motor 1.

Figure 7:
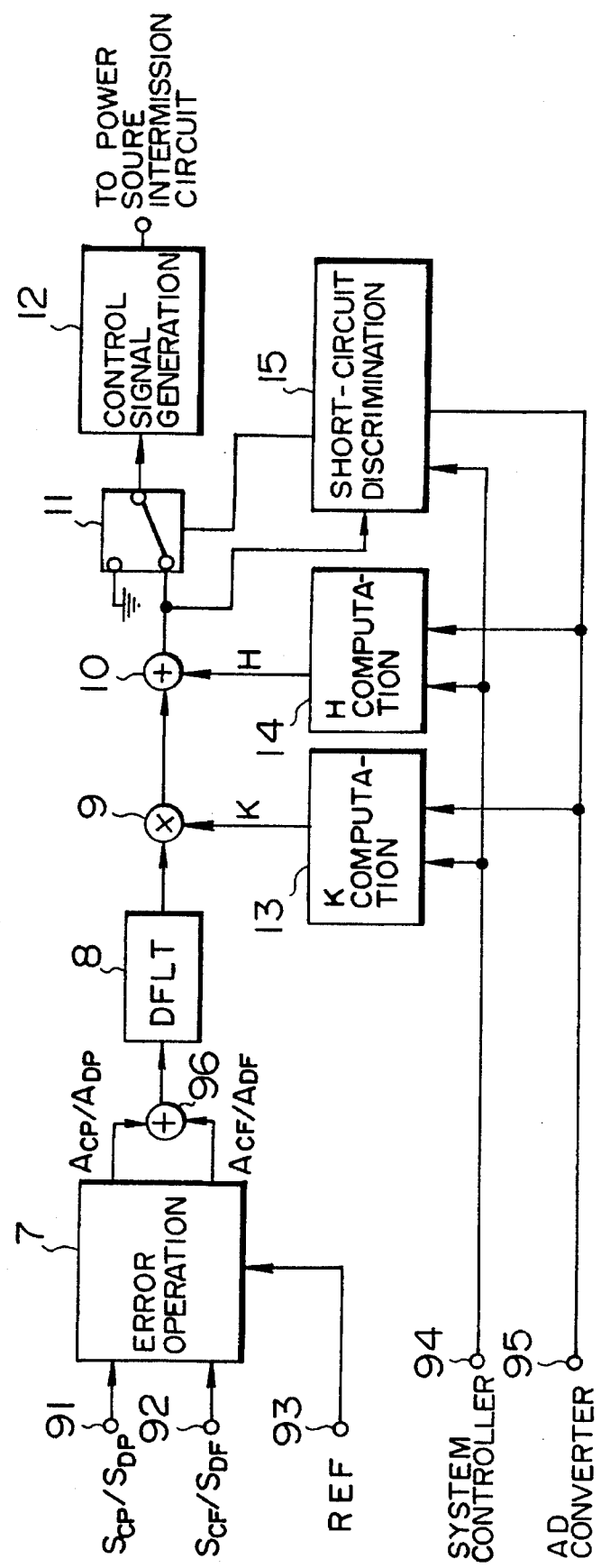
FIG. 7 is a system diagram showing an exemplification of a digital signal processing circuit used in the embodiment shown in FIG. 6.

Two digital signal processing circuits 6 shown on left and right of the figure are essentially the same as that used in the embodiment 1, but a processing circuit that has the structure shown in FIG. 7 has been adopted since one set of signal processing circuit processes two types of detected signals, respectively, in the case of the present embodiment. In FIG. 7, 91 represents an input terminal for phase signals $S_{CP}$ and $S_{DP}$ from the phase detectors 51 and 53 (FIG. 6), and 92 represents an input terminal for frequency signals $S_{CF}$ and $S_{DF}$ from the frequency detectors 4 and 54 (FIG. 6). Further, 93 represents an input terminal of a reference signal REF used in computing the phase error, 94 an input terminal of a system control signal supplied from the system controller 20 (FIG. 6), 95 an input terminal of various digital signals fed into from the AD converter 16 (FIG. 6), and 96 an adder for adding output signals (phase error signals $A_{CP}$ and $A_{DP}$ and frequency error signals $A_{CF}$ and $A_{DF}$) of the error operation circuit 7. Since the error operation circuit 7 is essentially the same as that used in the prior art shown in FIG. 1, concrete description thereof is omitted herein.

In the present embodiment, it has been arranged that one piece of AD converter 16 is used in common for the purpose of controlling both the capstan motor 1 and the drum motor 52 and a switch 56 is changed over under the control of the system controller 20 so that the AD converter 16 may be used by changing-over timewise in accordance with the object from a viewpoint of curtailment of the circuit scale. Further, a magnetic head for recording and reproducing control signals is used in the present embodiment as a phase detector of the capstan motor, but it is also possible, for instance, to use a pilot signal from an adjacent track and generate a rotational phase signal by obtaining a point where crosstalk quantities of these signals become equivalent to each other.

① Since a motor control unit of the present invention obtains a digital correction signal by processing a voltage value of a driving power source of a motor to be controlled and corrects a digital error signal using the digital correction signal, stable operation can be achieved in a case that a dry cell or the like having large voltage fluctuation is used as a driving power source of a motor to be controlled.

② Since it is possible to structure the whole signal processing circuits of a motor control unit with digital circuit components composed of semiconductor integrated circuits according to the present invention, it is possible to realize substantial miniaturization and low cost of the device. Further, since the signal processing circuit can be used in common for both a drum motor and a capstan motor, it is possible to expect substantial miniaturization and cost reduction by curtailment of the circuit scale. Besides, it is also possible to replace a part or the whole of the signal processing circuit with a microcomputer or the like.

③ Since it is possible to provide a discrimination circuit on a short-circuit to ground in a motor control unit of the present invention, it is possible to improve reliability of a magnetic recording and reproducing device for which miniaturization is required in particular.

④ It is possible to apply a motor control unit of the present invention to uses in a wide range such as motors for driving a compact disk and a floppy disk as well as a motor in a magnetic recording and reproducing device.

We claim:

1. A control unit of a direct-current motor comprising at least:

error arithmetic means for obtaining a digital error signal by processing a rotational frequency signal detected from a motor to be controlled;

control signal generating means for generating a pulse width modulation control signal using said error signal;

driving signal generating means for generating a motor driving signal by intermitting a direct-current power source using said control signal;

driving signal supply means for smoothing said driving signal and supplying the smoothed driving signal to the motor to be controlled; and error signal correction means for generating a digital correction signal by processing the voltage value of said power source and for correcting said error signal using said correction signal.

2. A control unit of a direct-current motor according to claim 1, wherein said control signal generating means is composed of a counter for counting clock pulses and a digital comparator for outputting a low level when a count value of clock pulses coincides with the value of said digital error signal and for outputting to a high level when the counting of clock pulses has made a round off.

3. A control unit of a direct-current motor according to claim 2, wherein said error signal correction means includes means for obtaining a correction factor that satisfies the relationship:

Correction factor×power source voltage≈constant and correcting said error signal by multiplying the value of said digital error signal by said correction factor.

4. A control unit of a direct-current motor according to claim 3, wherein said error signal correction means includes means for correcting said error signal by obtaining an offset value that satisfies the relationship:

Offset value×power source voltage≈constant and adding said offset value to the value of said digital error signal in addition to the means for correcting said error signal by a correction factor.

5. A control unit of a direct-current motor according to claim 1, wherein said error signal correction means includes means for obtaining a correction factor that satisfies the relationship:

Correction factor×power source voltage≈constant and correcting said error signal by multiplying the value of said digital error signal by said correction factor.

6. A control unit of a direct-current motor according to claim 5, wherein said error signal correction means includes means for correcting said error signal by obtaining an offset value that satisfies the relationship:

Offset value×power source voltage≈constant and adding said offset value to the value of said digital error signal in addition to the means for correcting said error signal by a correction factor.

7. A control unit of a direct-current motor according to claim 6, further comprising means for discriminating a short-circuit to ground by processing the voltage value of said smoothed driving signal and means for intercepting supply of said digital error signal to said control signal generating means based on the result of said discrimination.

8. A control unit of a direct-current motor according to claim 5, further comprising means for discriminating a short-circuit to ground by processing the voltage value of said smoothed driving signal and means for intercepting supply of said digital error signal to said control signal generating means based on the result of said discrimination.

9. A control unit of a direct-current motor comprising:

error arithmetic means for obtaining a digital error signal by processing a rotational frequency signal detected from a motor to be controlled;

control signal generating means for generating a pulse width modulation control signal using said error signal;

driving signal generating means for generating a motor driving signal by intermitting a direct-current power source using said control signal;

driving signal supply means for smoothing said driving signal and supplying the smoothed driving signal to the motor to be controlled;

error signal correction means for generating a digital correction signal by processing the voltage value of said power source and for correcting said error signal using said correction signal; and error signal intercepting means for discriminating a short-circuit to ground by processing the voltage value of said smoothed driving signal and for intercepting supply of said error signal to said control signal generating means based on the result of said discrimination.

10. A control unit of a direct-current motor according to claim 9, further comprising a change-over switch for taking in the voltage value of said power source and the voltage value of said smoothed driving signal selectively, an AD converter for converting the taken-in voltage value into a digital signal and supplying the digital signal to said error signal correction means and said error signal intercepting means, and control means for having said error signal correction means, said error signal intercepting means and said change-over switch operate while dividing them timewise.

11. A control unit of a direct-current motor comprising:

a plurality of error operation means for obtaining digital error signals by processing rotational frequency signals detected from a plurality of motors to be controlled for each motor;

a plurality of control signal generating means for generating individual pulse width modulation control signal for each motor using said error signals;

a plurality of driving signal generating means for generating driving signals for respective motors by intermitting a direct-current power source provided on each motor using said control signals;

a plurality of driving signal supply means for smoothing said driving signals and supplying them to respective motors to be controlled;

a plurality of error signal correction means for generating digital correction signals by processing respective voltage values of said power sources for each motor and for correcting said error signals for each motor using said correction signals; and a plurality of error signal intercepting means for discriminating a short-circuit to ground by processing respective voltage values of said driving signals after smoothing for each motor and for intercepting supply of said error signals to each of said control signal generating means based on the result of said discrimination.

12. A control unit of a direct-current motor according to claim 11, further comprising a common change-over switch for taking in the voltage value of said power source and the voltage value of said smoothed driving signal selectively for each motor, a common AD converter for converting the taken-in voltage value into a digital signal and supplying the digital signal to said error signal correction means and said error signal intercepting means provided on each motor, and common control means for having these error signal correction means and error signal intercepting means and said change-over switch operate while dividing them timewise.

13. A control unit of a direct-current motor according to claim 11, wherein said plurality of motors to be controlled include a drum motor for driving a rotary head and a capstan motor for running a tape in a helical scanning type magnetic recording and reproducing device.

* * * * *